United States Patent
Ozaki et al.

[11] Patent Number: 5,344,724
[45] Date of Patent: Sep. 6, 1994

[54] NON-AQUEOUS ELECTROLYTE SECONDARY CELL

[75] Inventors: Yoshiyuki Ozaki, Neyagawa; Akiyoshi Morita, Takaishi; Junichi Yamaura, Kobe; Zenichiro Ito, Hirakata, all of Japan

[73] Assignee: Matsushita Electric Industrial Co., Ltd., Osaka, Japan

[21] Appl. No.: 42,794

[22] Filed: Apr. 6, 1993

[30] Foreign Application Priority Data

Apr. 10, 1992 [JP] Japan ................. 4-090534

[51] Int. Cl.$^5$ .......... H01M 4/58; H01M 6/14
[52] U.S. Cl. .................. 429/94; 429/194; 429/218
[58] Field of Search .......... 429/218, 194, 94, 160

[56] References Cited

U.S. PATENT DOCUMENTS

| | | | |
|---|---|---|---|
| 4,383,011 | 5/1983 | McClelland et al. | 429/94 X |
| 4,423,125 | 12/1983 | Basu . | |
| 4,603,093 | 7/1986 | Edwards et al. | 429/160 X |
| 5,028,500 | 7/1991 | Fong et al. . | |
| 5,153,082 | 10/1992 | Ogino et al. . | |

FOREIGN PATENT DOCUMENTS

| | | |
|---|---|---|
| 57-208079 | 12/1982 | Japan . |
| 63-102166 | 5/1988 | Japan . |
| 63-121260 | 5/1988 | Japan . |
| 63-59507 | 11/1988 | Japan . |
| 1204361 | 8/1989 | Japan . |
| 282466 | 3/1990 | Japan . |

OTHER PUBLICATIONS

Takehara, Z, "Application of Host Compounds to Active Materials in Batteries", Journal Hyomen, vol. 21, No. 1, 1983, pp. 2–13.

Yamada, Y. et al. "Development of Elastic Graphite Materials," Journal Kino Zairyo, Sep. 1988, pp. 39–45.

*Primary Examiner*—John S. Maples
*Attorney, Agent, or Firm*—Stevens, Davis, Miller & Mosher

[57] ABSTRACT

A non-aqueous electrolyte secondary cell disclosed comprises a positive electrode sheet with a lithium-containing metal oxide as major positive electrode active material, a negative electrode sheet with graphitic particles as major negative electrode coating agent, a separator and a non-aqueous electrolyte, wherein the negative electrode sheet is produced by mixing the major graphitic particles, a binder and the like to produce a paste, coating the paste on both sides of a collector, pressing the coated collector, the coating layer having a porosity of 25% to 40%, and the graphitic particles have an average particle size of 3 $\mu$m to 25 $\mu$m which are produced by heat-treating a pitch in the molten state to produce carbonaceous mesophase particles, extracting the mesophase particles, carbonizing the mesophase particles and then heat-treating the carbonized particles through graphitization at 2500° C. to 2900° C. and which have a lattice plane spacing (d002) of 3.36 Å to 3.39 Å, a crystal size in the direction of the C axis (Lc) of 200 Å to 650 Å, as determined by X-ray diffraction analysis, and a ratio in intensity of the peak at 1360 cm$^{-1}$ to that at 1580 cm$^{-1}$ of 0.20 to 0.40 as determined by Argon laser-Raman spectrometry.

9 Claims, 5 Drawing Sheets

LAMELLA

NON-AQUEOUS ELECTROLYTE SECONDARY CELL

BACKGROUND OF THE INVENTION

1. Field of the Invention

The present invention relates to a non-aqueous secondary cell, especially a lithium secondary cell having a higher energy density and a higher output voltage for the end use.

2. Description of Related Art

Various cordless appliances, especially portable electronic appliances with semiconductor devices have desirably needed a secondary cell having a higher energy density and higher working voltage as a power supply for rendering the appliances more miniaturized and lighter in weight as the semiconductor devices have been developed to work at lower voltages. Non-aqueous electrolyte secondary cells with negative electrode active materials comprising alkali metals such as lithium and the like have been greatly expected to promise a family of cells which can satisfy the needs because they have advantages of a higher energy density and a lower weight. Therefore, research has been predominantly made to develop the lithium secondary cells. As positive electrodes for these lithium secondary cells, there have been proposed for example, oxides such as $V_2O_5$, $TiO_2$, and $MnO_2$; sulfides such as $TiS_2$; lithium-containing metal oxides comprising predominantly lithium and transition metals such as $LiCoO_2$, $LiNiO_2$ and the like as disclosed in Japanese Patent Publication (Post-Exam.) No. Sho 63-59507. A combination of any one of these positive electrodes with a negative electrode using lithium has made it possible to develop a non-aqueous secondary cell having a higher voltage on the order of 3 to 4 V.

However, the use of metallic lithium in the foil form as negative electrode led to an increased rate of deterioration of the negative electrode at the time of discharging and a reduced cycle life precluding charging and discharging at a high efficiency, though the theoretical energy density was increased. Moreover, it raised salty problems as the risks of ignition and burst while using the cells owing to the generation of lithium dendrite. Although research has been made to use an alloy of lithium with other metals such as aluminum and bismuth, there have also been produced problems of a reduction in the discharge voltage of the cells and unsatisfactory cycle life property.

As measures to cope with these problems, there have been proposed techniques of using lithium-containing metal oxides such as $LiCoO_2$ as positive electrode active materials together with negative electrodes such as carbonaceous elements produced with powdery carbon such as petroleum coke and pitch coke or by a vapor phase growth process as disclosed in Japanese Patent KOKAIs (Laid-open) Nos. Sho 63-121260 and Hei 1-204361, or with shapes of graphite or carbon particles having specific physical properties as disclosed in U.S. Pat. No. 4,423,125, Japanese Patent KOKAIs (Laid-open) Nos. Sho 57-208079 and Sho 63-102166 where lithium ions are intercalated or deintercalated.

The non-aqueous electrolyte secondary cells are desired to have excellent characteristics of a high rate of discharging, longer cycle life, higher energy density per unit weight and unit volume as well as a discharge voltage of 3 V or more, preferably 3.5 to 4 V or more. However, the conventional non-aqueous electrolyte secondary cells had problems of a lower reactivity and higher internal resistance compared to the aqueous secondary cells for alkaline storage batteries, so that they were required to have an increased rate of utilization of the active materials by using thinner positive and negative electrodes of a larger surface area (longer dimension) for measures to solve the problems.

Examination of some of the pseudo-graphitic materials as described above for negative electrode properties indicated that they had a capacity of 100 to 188 mAh/g of the carbonaceous materials and relatively noble potential at the carbon electrode during charging and discharging. It has been found therefore that even a combination with such a positive electrode as the $LiCoO_2$ having a high voltage and a high capacity resulted in a relatively low cell voltage and a low energy density.

Generally, the amount of lithium to be chemically intercalated between graphite layers has been reported to be limited at most to that corresponding to a graphite intercalation compound, $C_6Li$ (referred to as first stage) where one lithium atom is intercalated per six carbon atoms. The capacity in this case is theoretically 372 mAh/g of the carbonaceous material, while the use of the aforementioned pseudo-graphitic materials results in a much lower capacity. This is considered attributable to a smaller amount of lithium intercalated due to insufficient growth of the graphite layer structure (lower crystallinity).

As improved materials over the aforementioned pseudo-graphitic materials, graphitic materials produced by graphitization of carbon pitch fibers at 2500° C. to 2900° C. as disclosed in, for example, Japanese Patent KOKAI (Laid-open) No. Hei 2-82466, and those produced by graphitization of mesophase carbon fibers spun from molten pitch which we studied exhibited a possibility of achieving a capacity of about 200 to 300 mAh/g (at initial cycle), but there remain still problems that they alone could not be formed into a high density sheet when thin and large area negative electrode sheets were to be made and that even if the carbon fibers were ground, the bulk density of the powder was so small that the volumetric energy density of the sheets made from the powder was lower.

When the graphite materials having a high crystallinity were used to produce negative electrodes, gas evolution occurred owing to the decomposition of the electrolyte at the surfaces of the graphite electrodes at charging to cause a reduction of the intercalation reaction of lithium as reported in Journal "Surface" Vol. 21, No. 1, (1983) pp. 2–13 and Japanese Patent KOKAI (Laid-open) No. Hei 2-82466.

On the other hand, graphitized materials having a relatively high crystallinity produced by heat-treating coke at high temperatures have found to be of a relatively high capacity (200 to 250 mAh/g) though accompanied by gas evolution. However, as the graphite repeated expansion and shrinkage in the direction of C axis with the reactions of intercalation and deintercalation of lithium and the magnitude of the variation was large due to the high capacity, generally the cycle characteristics of these graphitized materials having a high crystallinity were consequently less preferable owing to the swelling of the negative electrodes.

It has been found, therefore, that the graphite having a lower crystallinity is preferred in view of the cycle property while the graphite having a higher crystallinity is preferred in view of the capacity property.

SUMMARY OF THE INVENTION

It is an object of the present invention to provide a non-aqueous secondary cell having a high output voltage, high capacity and an excellent cycle characteristic using graphitic particles which have a high capacity and an excellent cycle characteristic as well as exhibit less noble potential as negative electrode and a flatness in discharge voltage to overcome the aforementioned problems.

DETAILED DESCRIPTION OF PREFERRED EMBODIMENTS

The use of the negative electrodes of the present invention in combination with positive electrodes having a lithium-containing metal oxide as positive electrode active material can provide a non-aqueous secondary cell having a large cell capacity, stable discharge voltage at a high voltage on the order of 4 V and an excellent cycle characteristic at a high efficiency of charging and discharging.

In order to overcome the aforementioned problems, the graphitic particles of the present invention are produced by heat-melting pitches and maintaining the melt at a predetermined temperature in the range of 350° to 500° C. to produce carbonaceous mesophase particles as precursor which is carbonized by heat-treating in an inert atmosphere and graphitized by heat-treating at a temperature of 2500° C. to 2900° C., where said graphitic particles have a physical graphite structure having a lattice plane spacing (d002) of 3.36 Å to 3.39 Å, a crystal size in the direction of the C axis (Lc) of 200 Å to 650 Å, as determined by X-ray diffraction analysis as well as a ratio in intensity of the peak at 1360 cm$^{-1}$ to that at 1580 cm$^{-1}$ of 0.20 to 0.40 as determined by Argon laser-Raman spectrometry and an average particle size of preferably 1 μm to 25 μm, more preferably 3 μm to 20 μm. The thus produced graphitic particles have an optical anisotropy and a lamella structure consisting of single phase. To the graphitic particles, there are added a predetermined binder resistant to the non-aqueous electrolyte and the cell reaction and, if necessary, an electroconductive material such as other carbon powders, followed by kneading to produce a paste of the negative electrode coating agent. The paste is coated by a roller applicator onto a collector of copper, nickel or the like in the form of foil, dried to form a negative electrode coating layer on the collector, then pressed on the surfaces of the layer with a press or a roller under the conditions as the porosity of the layer being in the range of 25% to 40% to produce a sheet type negative electrode plate. Then, the thus produced negative electrode plate with graphitic particles in the form of a rectangular thin sheet having a predetermined thickness and a positive electrode plate, which has been produced by adding an electroconductive material, binder and the like to a major positive electrode active material of particulate lithium-containing metal oxide such as LiCoO$_2$ particles (powder) and coating the resultant mixture on a collector, in the form of a rectangular thin sheet are rolled in the spiral form with a microporous film separator being interposed between the negative and positive plates to produce a electrode plate assembly which is impregnated with a predetermined non-aqueous electrolyte in a predetermined amount and the whole is placed in a cylindrical cell case and sealed to accomplish a cylindrical non-aqueous secondary cell.

Alternatively, the electrode plate assembly may be compressed into a ellipse form and placed into a prismatic type cell case to produce a prismatic type non-aqueous secondary cell.

Alternatively, the aforementioned thin sheet type positive and negative electrode plates may be cut into a plurality of strips, which are stacked into a laminate of alternating positive and negative plate with the aforementioned separator being interposed therebetween and then placed into a prismatic type cell case to produce a prismatic type non-aqueous secondary cell.

The combination of the negative electrode plates obtained in accordance with the present invention with the thin sheet type positive electrode plates having the major positive electrode active material of lithium-containing metal oxide allows provision of a non-aqueous secondary cell having a high discharge voltage on the order of 4 V, a large cell capacity and an excellent cycle characteristic at a high efficiency of charging and discharging.

The present invention will be described under with reference to Examples and drawings.

EXAMPLES 1 AND 2 AND COMPARATIVE EXAMPLES 1 TO 7

1. Process for producing negative electrode

Various pitches, for example, tar pitch, by-product of production of coke, or petroleum pitch are placed in a vessel, melted with heat-treatment at about 350° to 480° C. to produce small spherical particles having an optical anisotropy of about 1 μm or less in the molten pitch phase (called a carbonaceous mesophase microsphere, i.e., an intermediate phase between liquid phase and solid phase) (process of carbonization in liquid phase). The molten pitch containing mesophase microspheres is further heat-treated at a constant temperature in the range as defined above, preferably at around 400° C. for 30 minutes to 2 hours to produce sequentially additional similar microspheres, a plurality of which become coalesced to grow into larger particles (see, "Development of Elastic Graphite Materials", Journal "KINO ZAIRYO" Sep. (1988) pp. 39–45). When the particles reached a predetermined size, the molten pitch is removed from the vessel and the particles are separated by extraction therefrom. This is accomplished by making use of the property of the produced particles that they are insoluble in aromatic solvents such as quinoline, that is, by dissolving the pitch with quinoline and removing the liquid to separate the particles therefrom. Alternatively, the molten pitch containing the produced particles may be centrifuged to separate and extract the particles.

The thus produced carbonaceous particles (referred to as carbonaceous mesophase particles hereunder) are used as a precursor which is subjected to thermal carbonization treatment. This is accomplished by placing the carbonaceous mesophase particles in a heating furnace (as an electric furnace) under an inert atmosphere such as gaseous nitrogen atmosphere, and heat-treating the particles at a rising temperature of not higher than 100° C./hr over an extended period of time for effecting thermal decomposition of the hydrocarbon compounds and other organic compounds included in the carbonaceous mesophase particles to achieve sufficient carbonization leaving only carbonaceous structure. When the temperature reached 900° C. to 1200° C. (generally 1000° C.), after retaining for one hour to ten hours, the carbonized mesophase particles are gradually cooled and removed out.

Next, the carbonized particles are subjected to thermal graphitization treatment. They are placed in a nonreactive heat-resistant vessel such as graphite crucible and the whole is placed in a graphitizing furnace as known by the name Acheson furnace or a high frequency induction furnace under an inert atmosphere such as gaseous nitrogen atmosphere and graphitized by heat-treating at a rising temperature. The graphitization temperature is attained by raising the temperature at a rate of not higher than 100° C/hr. for 24 to 50 hours. After retaining the particles at around the graphitization temperature for one hour or more, preferably 5 to 15 hours, they are gradually cooled. In this way they are transformed into graphitic particles in the round-edge forms such as spherical polyhedral shapes, ellipsoids and gourd-like shapes. The graphitization temperature is a predetermined temperature in the range of 2500° C. to 2900° C. This graphitization temperature can be correlated with the physical properties of the produced graphitic particles indicating the degree of graphitization as described later. The precursor of the graphitic particles, i.e., the carbonaceous mesophase particles used in the present invention are remarkably graphitized at temperatures in excess of 2000° C. At 2500° C. the physical properties required in the present invention can be attained, at temperatures between 2500° to 2700° C. the graphitization proceeds gradually and at temperatures from 2700° to 2850° C. the graphitization reaches equilibrium. Exceeding 2900° C., the particles become liable to crack and more reactive with the electrolyte to cause easily gas evolution, which is undesirable for the present invention. For this reason, the upper limit is 2900° C. and the temperature in the range of 2700° C. to 2850° C. is preferred in view of the charge and discharge characteristics. Temperatures lower than 2500° C. result undesirably in an insufficient discharge characteristic. In case the graphitic particles are used in the thin sheet type negative electrode plate for the cells of the present invention, they should have a particle size in the range of 3 $\mu$m to 25 $\mu$m as an average particle size from the particle size distribution measured by a laser diffraction method (50% diameter from the cumulative distribution) for the following reasons. The particle size smaller than 3 $\mu$m may cause intrusion of fine particles having an average size of 0.5 $\mu$m or less present on the surfaces of the negative electrodes into the pores of the microporous separator in contact with the negative electrodes, whereby partial short circuits may be formed within cell and the density of the coating with the particles may be reduced owing to an decrease in the bulk density of the particles. The particles whose size is larger than 25 $\mu$m may produce uneven coating on the surfaces of the collector when applied as a paste of the negative electrode coating agent, and further if it is 50 $\mu$m or more, there may be readily cause an reduction in coating adhesiveness, spalling off of rough particles, breaking of the coating off the surfaces of the collector at the time of rolling the negative electrode to produce floats which may be attributable to internal short circuits or reductions in cell characteristics (especially, discharge or cycle characteristics). The carbonaceous mesophase particles release organic compounds included therein through thermal decomposition as the heat-treatment proceeds so that they shrink to some extent. This shrinkage is taken into consideration to determine the particle size when the particles are produced and grown in the molten pitch. The rate of shrinkage is about 1.05 times in the carbonizing process and about 1.16 times for the particles separated from the molten pitch as the standard relative to the particle size after the graphitizing treatment. In addition, the average particle size should preferably be in the range of 5 $\mu$m to 20 $\mu$m from the standpoints of coating property and cell characteristics.

The physical properties of the graphitic particles used in the present invention are obtained depending upon the conditions in all the processes including the aforementioned graphitizing heat-treatment and their values are as follows:

a) The graphite structure has a lattice plane spacing (d002) of 3.36 Å to 3.39 Å, preferably 3.36 Å to 3.38 Å, and a crystal size in the direction of the C axis (Lc) of 200 to 650 Å, preferably 220 Å to 400 Å as determined by a powder X-ray wide angle diffractometer.

b) The ratio in intensity of the peak at 1360 cm$^{-1}$ to that at 1580 cm$^{-1}$, i.e., the value of 1360 cm$^{-1}$/1580 cm$^{-1}$ is in the range of 0.20 to 0.40 as determined by a Argon leser-Raman spectometry.

The use of appropriate graphitic particles having the physical properties as described above allows the negative electrode plates having excellent characteristics to be obtained.

The graphitic particles produced in the procedure as described above are headed with a binder and the like added to produce a paste of the negative electrode coating agent which is coated on a collector and dried to form a negative electrode coating layer, followed by pressing the layer with a press or a roller so as to achieve a porosity in the range of 25% to 40% under the following preparation conditions:

First, the paste of the negative electrode coating agent is charged into a screw stirring blender together with 7 parts by weight of a fluorinated binder added based on 100 parts by weight of the aforementioned graphitic particles, and kneaded with adding an aqueous solution of carboxymethyl cellulose (a 1 to 2% aqueous solution) to produce a paste having an appropriate consistency.

Next, the paste of the negative electrode coating agent (50% solids) is continuously coated on a collector hoop made of a metal foil having a thickness of about 10 to 30 μm to a predetermined thickness with a coating apparatus such as a roll applicator or a doctor blade applicator. The collector to be used may be of copper, nickel, stainless steel and the like, though a hoop coil of a copper foil having a thickness of 15 μm and a width of 350 mm was used in Examples. The collector may be coated on one side thereof and then on the opposite side to provide the negative electrode coating layer on both sides of the collector, or alternatively, the both sides may be coated at the same time by a coating methode with a doctor blade. Although a structure comprising a collector having a negative electrode coating layer provided only on one side thereof may be employed, the volumetric energy density is lowered. The thus produced collector having negative electrode coating layers applied are dried by passing through a drying tunnel at 120° C.

Figure 1A:
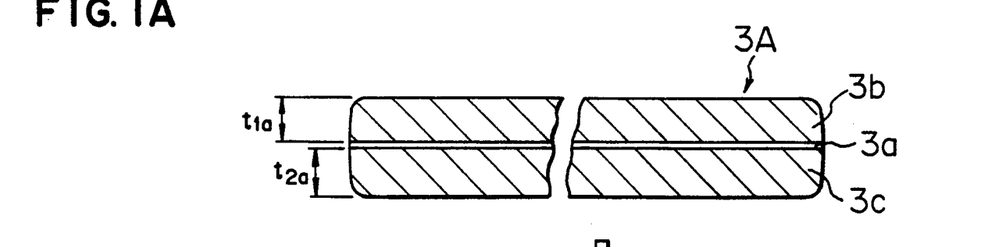
FIG. 1A is a schematic cross-sectional view of a negative electrode plate at one stage of the process for producing a negative electrode according to the present invention.
Figure 1B:
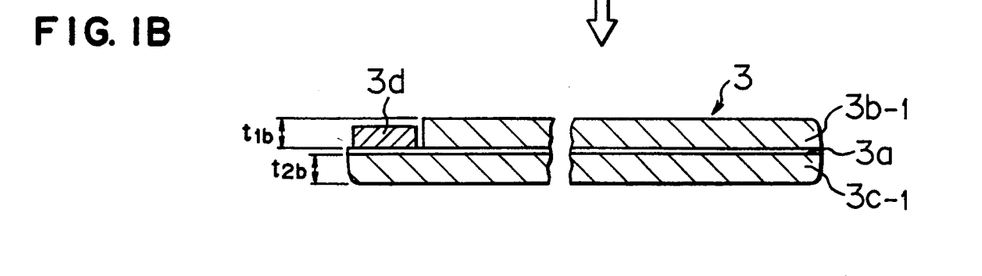
FIG. 1B is a schematic cross-section view of the negative electrode similar to that in FIG. 1A at the subsequent stage of the process.

The negative electrode plate 3A produced after coating and drying as described above has a cross-section as shown in FIG. 1A where 3A is the negative electrode plate, 3a is a collector made of copper foil, 3b and 3c are negative electrode coating layers after applied and dried, which both should be of as same thickness as possible. Under such conditions, the negative electrode coating layers have a porosity of around 50%, and the energy density is lower and on the contrary the electric resistance of the plate is higher. Therefore, the both sides must be compressed. They are pressed with a hydraulic flat press or a roller press having a diameter of 300 to 400 mm to change the thicknesses of the negative electrode coating largers from t1a and t2a to t1b and t2b, respectively, as shown in FIG. 1B. The degree of compression is controlled with the porosity calculated based on the solids expressed as the net specific gravity. The porosity must be controlled in the range of 25% to 40% as a result of investigation on the volumetric energy density and cell characteristics. That is, at lower than 25%, the absorbability to electrolyte is reduced with an increase in unevenness of liquid absorption and a reduction in reactivity, so that the cell characteristics is significantly reduced. On the other hand, at above 40%, there are caused insufficient volumetric energy density, a lower adhesive strength between the collector 3a and the negative electrode coating layers 3b-1 and 3c-1 after compression, ease of separation therebetween and a higher electric resistance. For these reasons, the porosity outside the defined range can not be accepted.

The negative electrode plate 3 obtained in the procedure set forth above is cut to a predetermined size and a negative electrode lead strip 3d made of nickel is fused on the plate as shown in FIG. 1B which is used as a negative electrode of the present invention.

2. Cell

The negative electrode plate as described above was evaluated for discharge voltage characteristic, and cells of the AA size made using the negative electrode plate were evaluated for discharge characteristic and charge-discharge cycle characteristic. The results will be described below in comparison with those obtained using other conventional carbon materials.

The negative electrode plates used in Examples of the present invention were those subjected to the graphitizing heat-treatment at 2800° C. (Example 1) and at 2500° C. (Example 2) while in Comparative Examples those heat-treated at a lower temperature, i.e., at 2350° C. (Comparative Example 1) and at 2000° C. (Comparative Example 2) were used.

The constitution of the cells of the present invention will be described in detail hereunder.

Positive electrode plates were produced as follows: lithium carbonate and cobalt carbonate were mixed to achieve an equiatomic composition of lithium and cobalt and the mixture was heat-treated at 900° C. for 10 hours to synthesize $LiCoO_2$ which was used as active material. 100 parts by weight of this $LiCoO_2$ powder, 3 parts by weight of acetylene black, 4 parts by weight of graphite, and 7 parts by weight of fluorinated resin binder were mixed and suspended in an aqueous solution of carboxymethyl cellulose to produce a paste. Next, the paste was coated on both sides of an aluminum foil having a thickness of 20 μm, dried, and then rolled to produce a thin sheet type electrode plate having a thickness of 0.19 mm, width of 40 mm and length of 250 mm. The weight of the coating agent was 5 g.

Negative electrode plates used were prepared by compressing an electrode plate having a negative electrode coating layer on both sides thereof, the total thickness of which was 0.22 mm on average, with a roll press into a thickness of 0.17 mm, thereby achieving a porosity of the negative electrode coating layers of 35%. The electrode plates have a width of 41 mm, length of 260 mm, and an average thickness of 0.185 mm. The weight of the negative electrode coating layers was 2.5 g.

Figure 2:
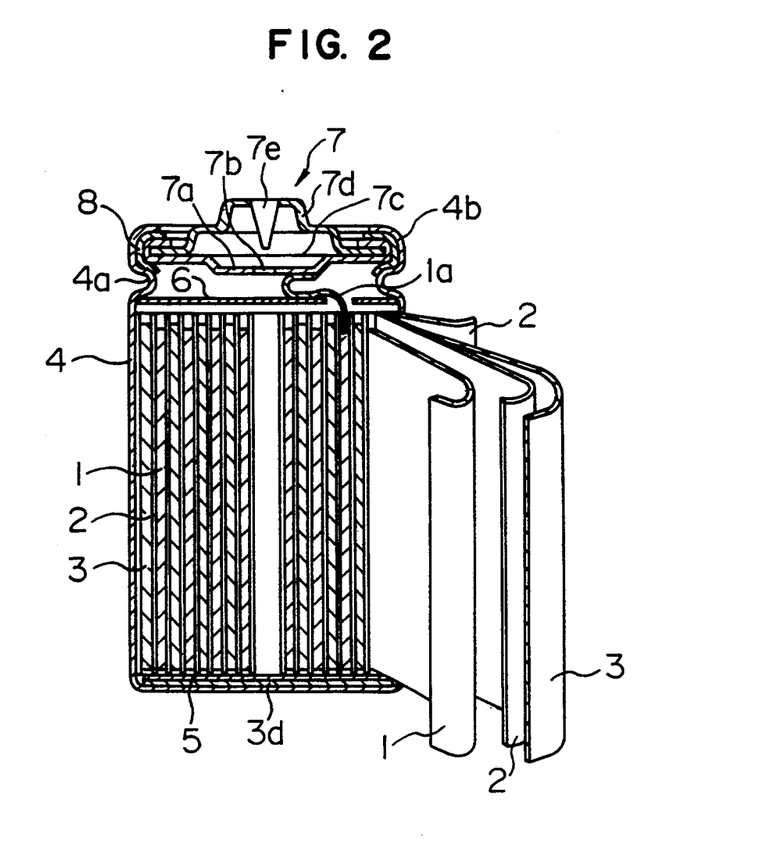
FIG. 2 is a schematic vertically cross-sectional view of the cylindrical cell in an example of the present invention.

FIG. 2 shows a vertically cross-sectional view of the cylindrical cell used in the examples of the present invention.

To the positive electrode plate 1 and the negative electrode plate 3, there were fused on their collectors a positive electrode lead strip 1a (made of aluminum) and a negative electrode lead strip 3d (made of nickel), respectively. The positive electrode plate and the negative electrode plate were rolled into a spiral form with a microporous separator 2 having a thickness of 25 μm, width of 45 mm, and length of 760 mm being interposed therebetween to produced a electrode plate assembly which was placed into a cell case 4 made of nickel-plated stainless steel sheet on a bottom insulating plate 5. An upper insulating plate 6 was inserted and then ring projection 4a was provided on the open end of the cell case for supporting an insulating gasket 8, thereafter, a tip of a positive electrode lead strip 1a was fused to a seal plate 7 having a valve membrane 7C via an insulating gasket 8, a non-aqueous electrolyte as described later was injected into the electrode plate assembly, then the seal plate 7 was attached onto the cell case, the upper edge 4b of the cell case was bended inward to tightly seal the case to accomplish the non-aqueous electrolyte secondary cells having a diameter of 14 mm and a height of 50 mm used in Examples 1 and 2. The solvents for the non-aqueous electrolyte were a two or three component composition containing ethylene carbonate (EC) as base and at least one components selected from diethyl carbonate (DEC), methyl acetate (MA), ethyl acetate (EA) and dimethoxy ethane (DME) which are solvents miscible with EC and having a low boiling point and a high electroconductivity. The ethylene carbonate is highly suitable for the graphitic particles of the negative electrodes used in the cells of the present invention exhibiting no side-reaction such as decomposition during charging and having advantageous influence to the cycle life. Among them a two or three component composition containing at least EC and DEC is more preferred. In FIG. 2, 7a designates an inner seal plate, 7b does a venting hole, 7d does a cap terminal and 7e does a blade projection-outlet opening.

As solutes, lithium perchlorate ($LiClO_4$), lithium hexafluorophosphate ($LiPF_6$), and lithium tetrafluoroborate ($LiBF_4$) can be used and $LiPF_6$ is preferred. In this Example, an equivolume composition of EC and DEC containing $LiPF_6$ in an amount of one mole/l dissolved was used as solvent.

Next, cells for Comparative Example 1 (2350° C.) and Comparative Example 2 (2000° C.) having the identical structure to that used for the cells of the present invention were arranged with the same electrolyte as that used in the present invention using the graphitic particles which were prepared by conducting the graphitization of the carbonaceous mesophase particles at different temperatures from those used in the examples of the present invention, which mesophase particles were the same as those used for producing the graphitic particles of the negative electrode plates of the present invention.

In another Comparative Examples, needle coke (heat-treated at 1500° C.) and the product obtained by graphitizing the needle coke at 2800° C. were ground, respectively, and made into negative electrode plates in the identical procedure to that used in the present invention, which were used to make cells of the AA size in the same way as in Examples 1 and 2. The cells using the needle coke and those using the graphitized product were employed in Comparative Examples 3 and 4, respectively.

In still another Example, carbon fibers having a diameter of 12 μm and an orientation in the direction of the longitudinal fiber axis produced by extracting mesophase microspheres from the molten pitch, in which the mesophase microspheres were formed, and melt-spinning the mesophase were ground and heat-treated at 2800° C., made into negative electrode plates, followed by arranging cells with the plates in the identical procedure to that in Example 1. This is referred to as Comparative Example 5.

Furthermore, carbon fibers having a diameter of 10 μm produced from molten pitch were heat-treated at 2400° C. and made into negative electrode plates, with which cells were constituted. This is referred to as Comparative Example 6.

Furthermore, spherical graphite particles (#9400 series) available from SUPERIOR GRAPHITE Co. U.S. which had been produced by heat-treating spherical isotropic particles called fluid coke at temperatures of 2700° C. to 2800° C., were used as Comparative Example. The spherical graphite particles were as large as 100 to 150 μm so that they were difficult to coat as they were. Therefore, they were ball-milled to 15 to 25 μm and then made into negative electrode plates, with which cells having the identical structure to that in Example 1. This is referred to as Comparative Example 7.

Nine types of negative electrode plates as above were used to arrange the cylindrical cells of the AA type which are summarized in Table 1 with the type and physical values of the carbon material used for the negative electrode plates.

TABLE 1

| Sample No. | Example tested | Type of carbon materials | Heat-treatment temperature (°C.) | Lattice plane spacing d(002) (Å) | Size of C axis crystallite Lc (Å) | Raman spectrum 1360 cm$^{-1}$/ 1580 cm$^{-1}$ | Average size (μm) | Remarks |
|---|---|---|---|---|---|---|---|---|
| 1 | Ex. 1 | Carbon Mesophase (anisotropy) | 2800 | 3.37 | 250~260 | 0.26 | 6.5~8 | |
| 2 | Ex. 2 | Carbon Mesophase (anisotropy) | 2500 | 3.39 | 200~215 | 0.38 | 7~8.5 | |
| 3 | Co. Ex. 1 | Carbon Mesophase (anisotropy) | 2350 | 3.40~3.41 | 160~170 | 0.45 | 7~9 | |
| 4 | Co. Ex. 2 | Carbon Mesophase (anisotropy) | 2000 | 3.42 | 140~150 | 0.80 | 7.5~9 | |
| 5 | Co. Ex. 3 | Needle coke | 1500 | 3.47 | About 50 | 1.1 | 8~15 | 1 hr. Ball milled |
| 6 | Co. Ex. 4 | Needle coke | 2800 | 3.39 | 190~220 | 0.3 | 6~13 | 1 hr. Ball milled |
| 7 | Co. Ex. 5 | Mesophase spun fibers (milled) | 2800 | 3.37 | 200~230 | 0.25 | — | 1 hr. Ball milled |
| 8 | Co. Ex. 6 | Pitch carbon fibers (milled) | 2400 | 3.42 | 120~150 | 0.6 | — | 1 hr. Ball milled |
| 9 | Co. Ex. 7 | Fluid coke (spherical) (x φ 140 μm) | 2700~2800 | 3.39 | 175~185 | 0.19 | — | 1 hr. Ball milled |

Figure 3:
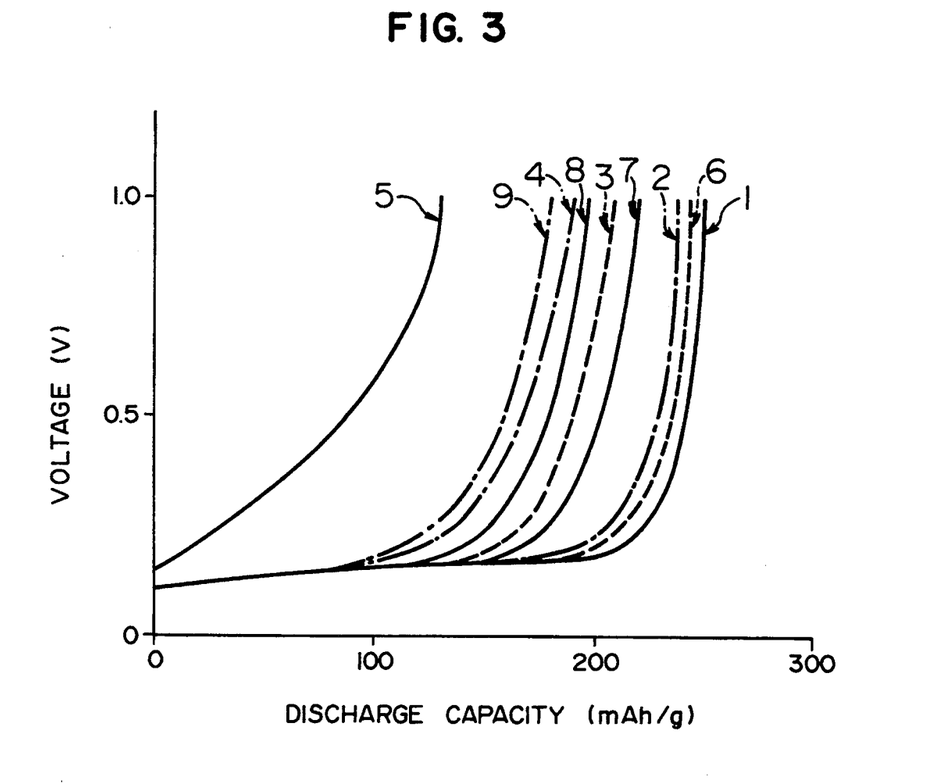
FIG. 3 is a graph showing a comparison in discharge voltage characteristic between a negative electrode plate of the present invention and a control one.

Next, the same negative electrode plate as that used in each cell was rolled together with a counter electrode made of lithium metal foil having a thickness of 0.15 mm, width of 41 mm and length of 250 mm with the same polypropylene separator as in previous cells being interposed therebetween, and immersed into the same electrolyte, excepting Comparative Example 3, as in Example 1, and charged at 100 mA until an isoelectric potential to lithium is reached as end point and then discharged at 100 mA until 1.0 V relative to lithium. The discharge characteristics are shown in FIG. 3 in terms of mAh/g of the negative electrode coating layer. For the product from the heat-treating the needle coke at lower temperatures as in Comparative Example 3, a mixture of solvents, PC and DME in a ratio of 1:1 by volume was better to be used presumably owing to the property of the product close to amorphous. This could apply to the cells, so that this solvent mixture was employed to arrange the cells.

Figure 4:
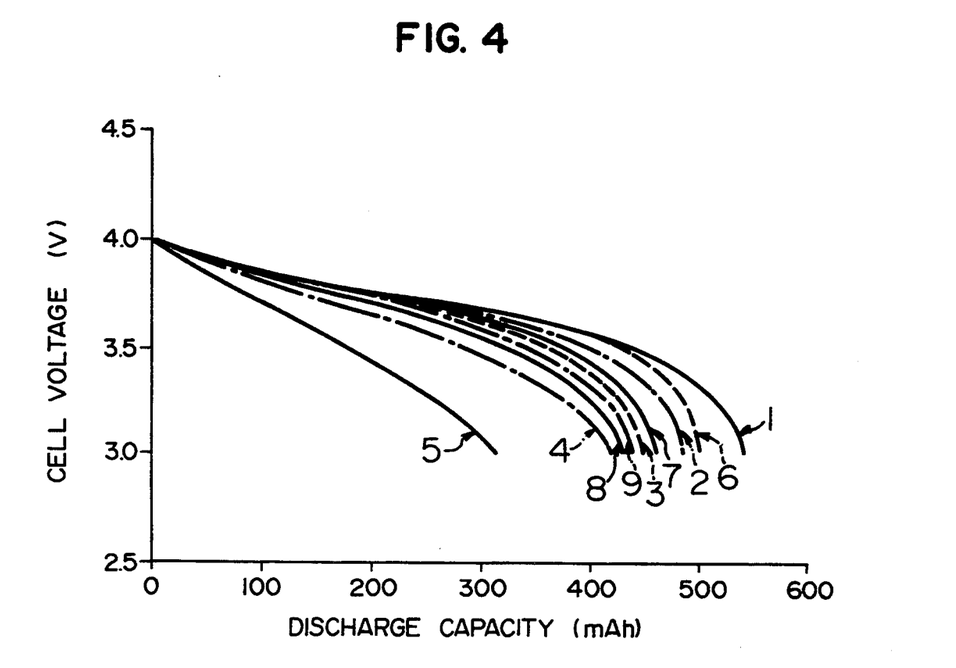
FIG. 4 is a graph showing a comparison in discharge characteristic between a cell of the present invention and a control one.
Figure 5:
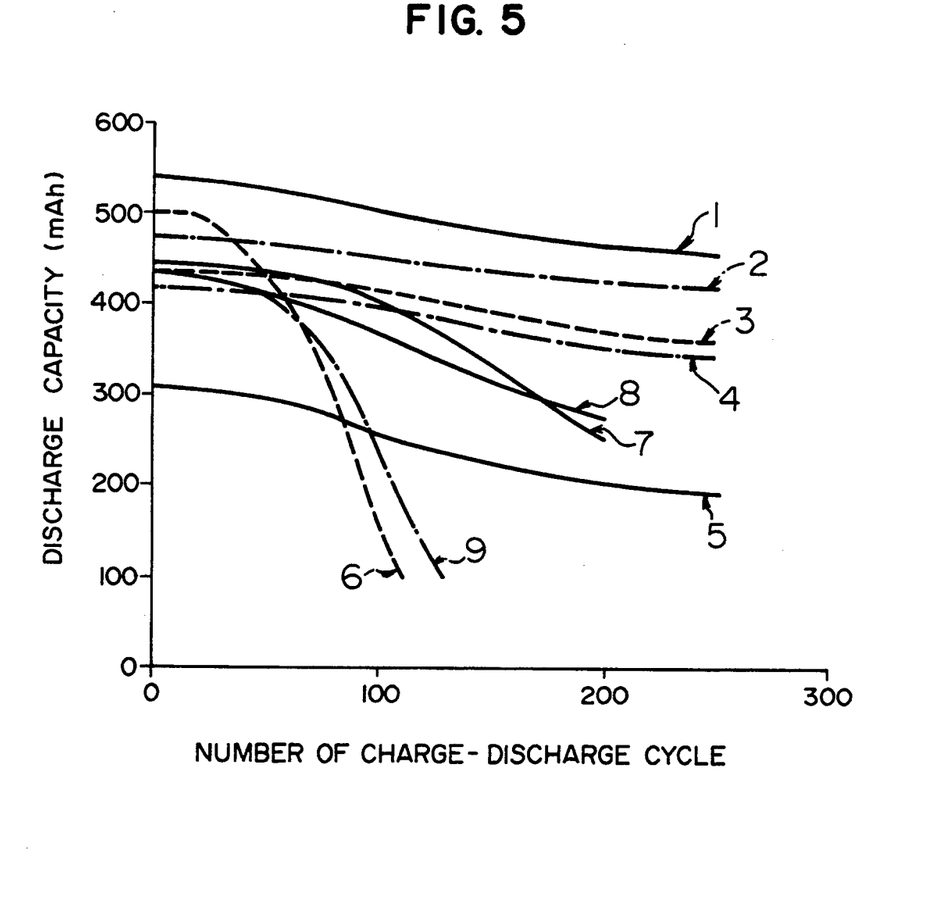
FIG. 5 is a graph showing a comparison in cycle characteristic between a cell of the present invention and a control one.
Figure 6:
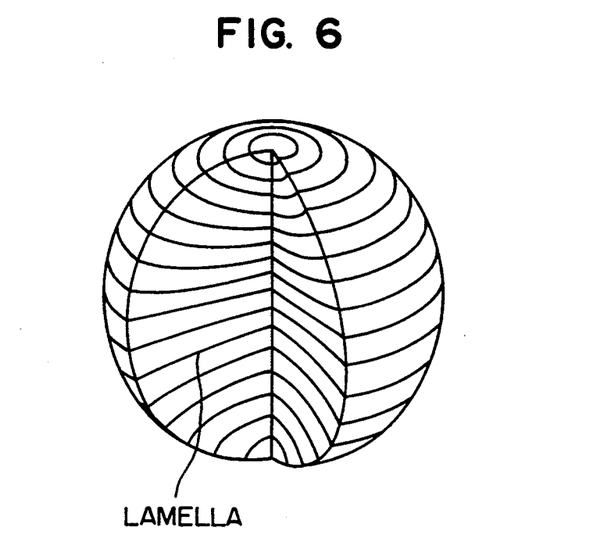
FIG. 6 is a schematic perspective view of a carbonaceous mesophase particle, a quater of which was removed, showing the structure thereof.

Next, nine types of cells were charged at a voltage of 4.1 V and at an initial charge current controlled to an upper limit of 600 mA for 1.5 hours, then paused for 30 minutes, and thereafter, discharged at a constant current of 500 mA with a terminal voltage of 3 V. This was one cycle, which was repeated. The discharge characteristics after 20 cycles are shown in FIG. 4. The cycle characteristics after further repeating the charge-discharge cycle are shown in FIG. 5. The cell numbers are corresponding to those of samples shown in the table 1.

From these results, it can be seen that the use of the negative electrode plates of Examples 1 and 2 leads to a larger discharge capacity under the condition of less noble negative electrode potential at discharging, similarly a larger discharge capacity even when they are incorporated in cells as well as a smaller reduction and a higher stability in capacity in the long term cycle tests. The use of the graphitized product from the needle coke of Sample No. 6 (Comparative Example 4) and the graphitized product from the carbon fibers produced by spinning the mesophase (the milled product was further ground) of Sample No. 7 (Comparative Example 5) resulted in a significant deterioration in cycle properties in either case though the initial capacity was high, which may be considered attributable to a variation, and hence deterioration, of crystalline structure caused by intercalation and deintercalation of lithium ions at charging and discharging, so that they can scarcely find practical application. The fluid coke of Sample No. 9 (Comparative Example 7) has a larger particle size due to its production process (an average particle size of 100 $\mu$m or more) so that it is required to be ground for use in the negative electrode plates which may produce particle configuration of polyhedron or strain in the crystal structure and therefore considered liable to deteriorate similarly to the aforementioned Samples Nos. 6 and 7.

Figure 7A:
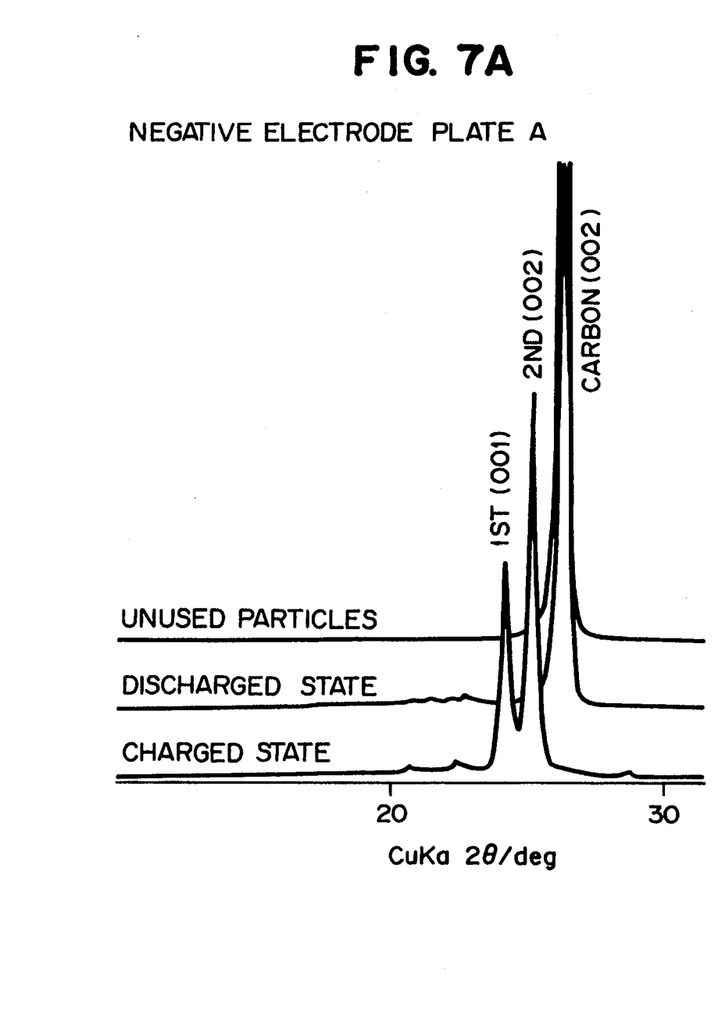
FIGS. 7A and 7B show X-ray diffraction patterns of a negative electrode of the present invention and a control one in the charged and discharged states.
Figure 7B:
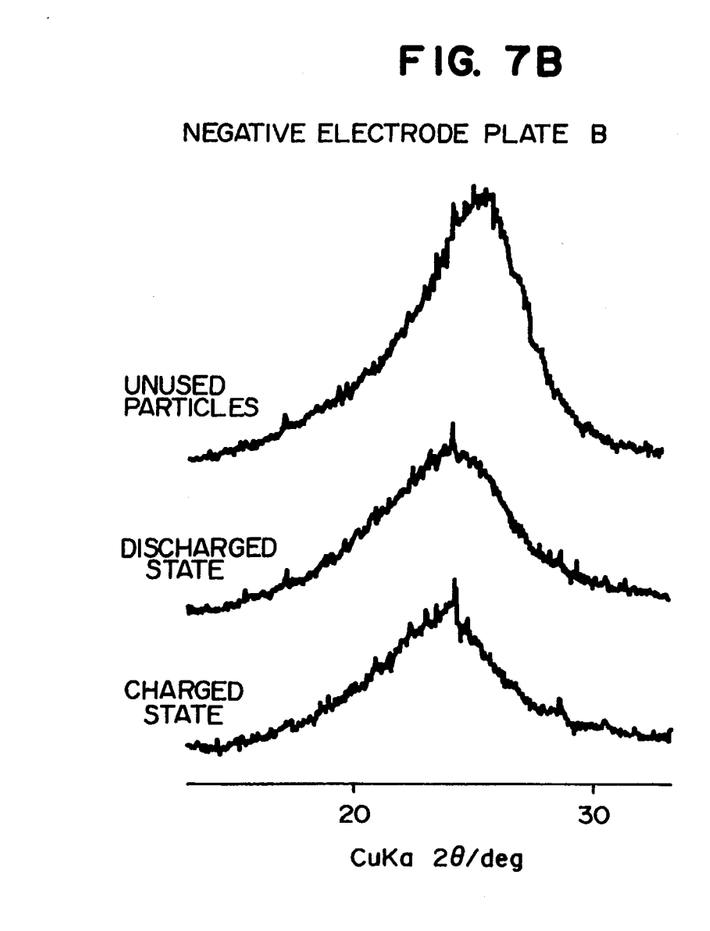

As above, the cells of the present invention are good in flatness of discharge voltage and large in discharge capacity, which may be attributed to the carbonaceous mesophase particles, the precursor of the graphitic particles used in the negative electrode plates, having a structure where the molecules of polymerized aromatic compounds produced in the heat-treatment of pitch are oriented plainly in a constant direction to form lamellae which are stacked to be confined within a sphere. This configuration is stable without changing even through the high temperature treatment so that the intercalation and deintercalation reactions of lithium ions are considered to proceed smoothly and stably with less variation due to cycles. This is significantly depending upon the heat-treatment temperature as the temperatures in the range of 2500° C. to 2900° C., preferably 2700° C. to 2850° C. imparting further advantageous characteristics. FIG. 7 shows X-ray wide angle diffraction patterns for the negative electrode plate A using the graphitic particles of Example 1 in accordance with the present invention and the negative electrode plate B using the carbonized product produced by heat-treating the same precursor, carbonaceous mesophase particles at 1200° C. when both were subjected to the charge-discharge cycles. As can be seen from the Figure, the negative electrode plate A of the present invention is apparently susceptible to the intercalation exhibiting no difference in the conditions between the discharged particles and the unused ones as the diffraction pattern showing sharp peaks. In contrast, the negative electrode plate B with the product treated at lower temperatures exhibited no difference between the charged state and the discharged state indicating that the absorption phenomenon of lithium ions onto micropores predominantly occurs. This tendency can be noted in other products heat-treated at 1800° C. or lower.

When the present invention is applied to a cylindrical spiral electrode plate assembly, the thickness of the positive and negative electrode plates should be less than 350 $\mu$m, preferably 300 $\mu$m or less in order to render suitable for high efficiency charge-discharge application as can be seen from FIGS. 4 and 5 showing the characteristics. That is for stabilizing the reaction by suppressing the current density as well as for diminishing partial short circuits and deviation in characteristics by making the restraint condition of the assembly uniform.

Figure 8:
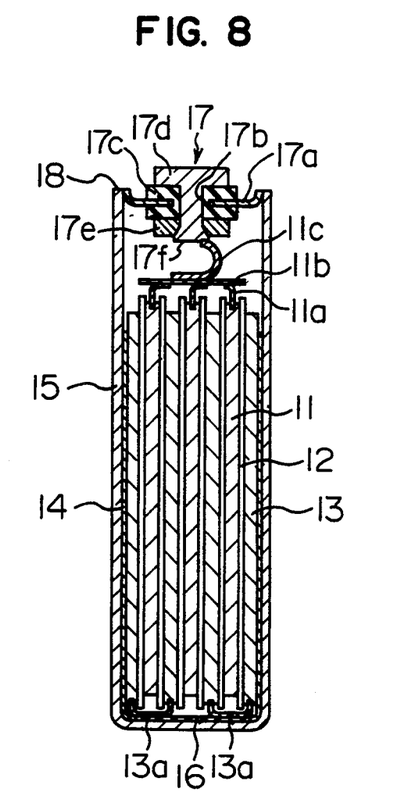
FIG. 8 is a schematic cross-sectional view of a prismatic type cell of the present invention.
Figure 9A:
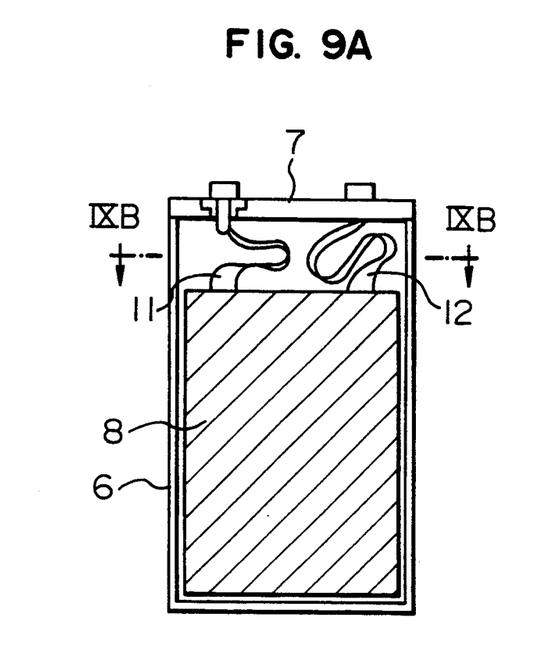
FIG. 9A is a schematic vertically cross-sectional view of a prismatic type cell of the present invention.
Figure 9B:
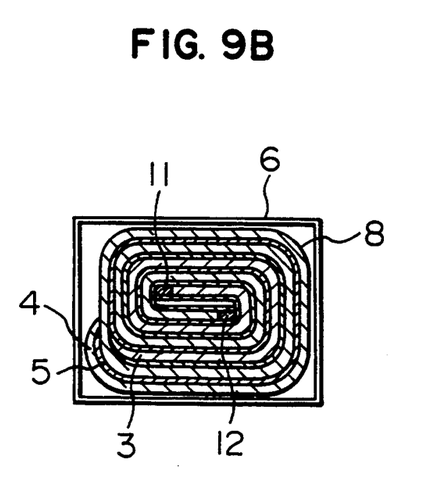
FIG. 9B is a schematic transversely cross-sectional view of the cell as shown in FIG. 9A.

The present invention has been described with respect to the cylindrical cells, though similar effects can be achieved by applying to prismatic type cells. FIG. 8 shows one of them. Positive electrode plates 11 and negative electrode plates 13 are produced by using the same thin sheet type electrode plate as that in the cylindrical, cutting the plate into a predetermined size, and fusing positive electrode lead strips 11a and negative electrode lead strips 13a onto the positive electrode plates and the negative electrode plates, respectively. A plurality of these plates are stacked alternating the positive and negative electrode plate with a separator 12 being disposed therebetween to form a electrode plate assembly, and the negative electrode lead strips are connected with each other on the bottom side while the positive electrode lead strips are connected in combined state onto a connection terminal plate 11b on the upper side, which terminal plate is connected to a rivet terminal 17d of a seal plate 17 via a connection lead. 15 is a prismatic type cell case made of nickel plated stainless steel. The electrode plate assembly is placed in the cell case with interposing therebetween an insulating plate 16 and a nickel plated spring lead plate 14 effecting forced contact for allowing the control of the restraint condition of the assembly as well as rendering the contact condition between the negative electrode plate and the case better. The aforementioned electrolyte was injected into the cell case which was sealed with a laser welding as shown in FIG. 18. When the number of the electrode plates to be stacked is small, the spring lead plate 14 effecting forced contact may be omitted. In FIG. 8, 11c is a connection lead, 17b is a terminal hole, 17c is an insulating gasket, 17e is a washer, 17f is a caulked portion of a rivet. Similarly, an example of the case where the spiral electrode plate assembly is used in the prismatic type cell is shown in FIGS. 9A and 9B, in which 3 designates a positive electrode plate, 4 does a negative electrode plate, 5 does a separator, 6 does a cell case, 7 does a seal plate, 8 does an electrode plate assembly, 11 does a rectangular lead for a positive collector, and 12 does a rectangular lead for a negative collector.

EXAMPLE 3

Negative electrode plates having a negative electrode coating layer whose porosity was varied by varying the degree of compression of the negative electrode plates identical to those used in Example 1 as shown in Table 2. They were used in combination with positive electrode plates consisting of $LiCoO_2$ identical to those used in the previous examples and subjected to the similar charge and discharge cycle tests.

TABLE 2

| Cell | Porosity (%) | Capacity at 10th cycle (mAh) | Capacity retention (%) |
|---|---|---|---|
| Cell A | 22 | 472 | 45 |
| Cell B | 25 | 526 | 80 |
| Cell C | 35 | 530 | 85 |
| Cell D | 40 | 506 | 83 |
| Cell E | 42 | 420 | 63 |

In Table 2, there are indicated the capacity at 10th cycle and the capacity retention at 300th cycle (the capacity at 300th cycle/the capacity at 10th cycle)×100. It can be seen that Cells B, C and D exhibited a higher capacity of 500 mAh or more and a higher capacity retention of 80% or more with a reduced cycle deterioration. However, Cell A exhibited a significant cycle deterioration with a reduction in the initial capacity and a reduced capacity retention of 45%. This is considered as attributable to the higher degree of compression of the negative electrode plates and the too low porosity which may cause a reduction in performance with a reduced electrolyte absorbability and reduced liquid retentive ability. On the other hand, Cell E attained a capacity of only 420 mAh with a lower capacity retention of 63%. This is considered owing to a higher porosity which causes a reduction in capacity per unit volume and to an insufficient adhesive bond strength between the coating agent and the collector which may cause a significant determination in cycle characteristic.

It can be noted from these results that the porosity of the negative electrode plates should be in the range of 25 to 40% with the optimum porosity being on the order of 35%.

What is claimed is:

1. A non-aqueous electrolyte secondary cell comprising a sheet type positive electrode plate with a lithium-containing metal oxide as a major positive electrode active material, a sheet type negative electrode plate with graphitic particles as a major negative electrode coating agent, a separator and a non-aqueous electrolyte, wherein;

said negative electrode plate is produced by adding to the graphitic particles as a major component a binder to produce a paste, coating the paste on both sides of a metal foil collector, pressing the coated collector to produce a sheet type electrode plate, said coating layer having a porosity of 25% to 40%; and said graphitic particles are produced by heat-treating a pitch in the molten state to produce carbonaceous mesophase particles, extracting and separating the particles as precursor, carbonizing the mesophase particles and then heat-treating the carbonized particles through graphitization at 2500° C. to 2900° C.

2. The non-aqueous electrolyte secondary cell according to claim 1, wherein said graphitic particles have an average particle size of 3 μm to 25 μm.

3. The non-aqueous electrolyte secondary cell according to claim 1, wherein said graphitic particles have a lattice plane spacing (d002) of 3.36 Å to 3.39 Å, a crystal size in the direction of the C axis (Lc) of 200 Å to 650 Å, as determined by X-ray diffraction analysis, and a ratio in intensity of the peak at 1360 cm$^{-1}$ to that at 1580 cm$^{-1}$ of 0.20 to 0.40 as determined by Argon laser-Raman spectrometry.

4. The non-aqueous electrolyte secondary cell according to claim 1, wherein said graphitic particles are spherical particles of mesocarbon microbeads.

5. A non-aqueous electrolyte secondary cell comprising a sheet type positive electrode plate with a lithium-containing metal oxide as a major positive electrode active material, a sheet type negative electrode plate with graphitic particles as a major negative electrode coating agent, a separator and a non-aqueous electrolyte, wherein;

said negative electrode plate is produced by adding to the graphitic particles as a major component a binder to produce a paste, coating the paste on both sides of a metal foil collector, pressing the coated collector to produce a sheet type electrode plate, said coating layer having a porosity of 25% to 40%;

said graphitic particles are produced by heat-treating a pitch in the molten state to produce carbonaceous mesophase particles, extracting and separating the particles as precursor, carbonizing the mesophase particles and then heat-treating the carbonized particles through graphitization at 2500° C. to 2900° C.; and characterized by:

having an average particle size of 3 μm to 25 μm, b) having a lattice plane spacing (d002) of 3.36 Å to 3.39 Å, as determined by X-ray diffraction analysis, and c) having a ratio in intensity of the peak at 1360 cm$^{-1}$ to that at 1580 cm$^{-1}$ of 0.20 to 0.40 as determined by Argon laser-Raman spectrometry.

6. The non-aqueous electrolyte secondary cell according to claim 5, wherein said positive electrode plate and said negative electrode plate have a thickness of 120 μm to 350 μm, respectively.

7. The non-aqueous electrolyte secondary cell according to claim 6, wherein said cell is a cylindrical cell containing an electrode plate assembly which is produced by rolling a rectangular positive electrode plate and a rectangular negative electrode plate in the spiral form with a separator being interposed therebetween.

8. The non-aqueous electrolyte secondary cell according to claim 6, wherein said cell is a prismatic type cell containing an electrode plate assembly which is produced by rolling a rectangular positive electrode plate and a rectangular negative electrode plate in the spiral form with a separator being interposed therebetween and then compressing the roll into an ellipse form.

9. The non-aqueous electrolyte secondary cell according to claim 6, wherein said cell is a prismatic type cell containing an electrode plate assembly which is produced by stacking a plurality of positive and negative electrode plates in a laminate form.

* * * * *